Patented Jan. 1, 1924.

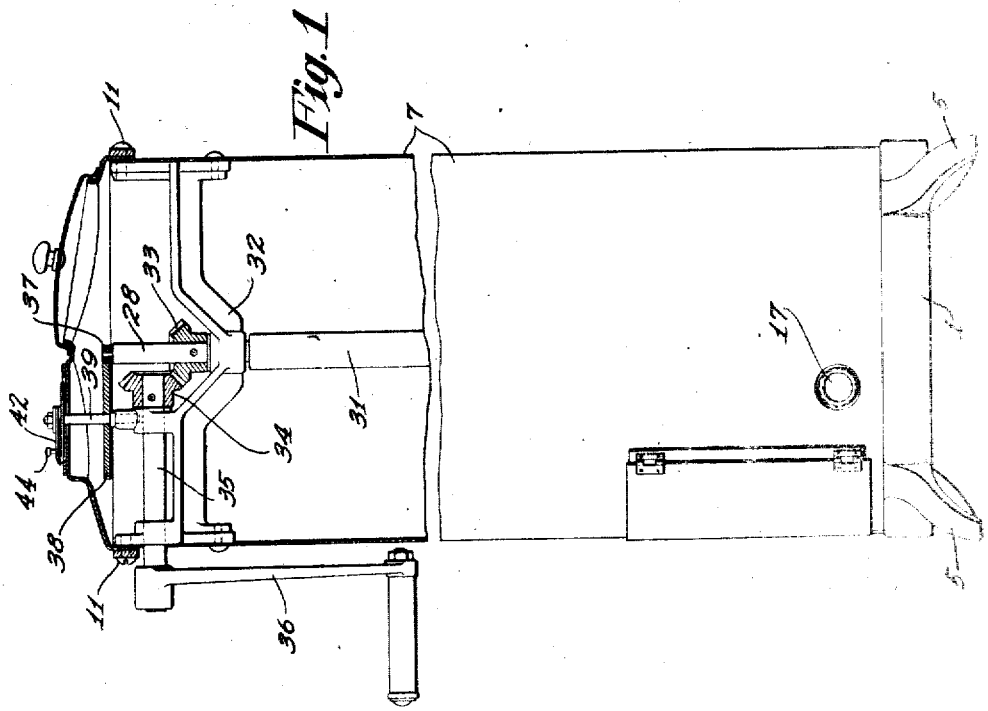
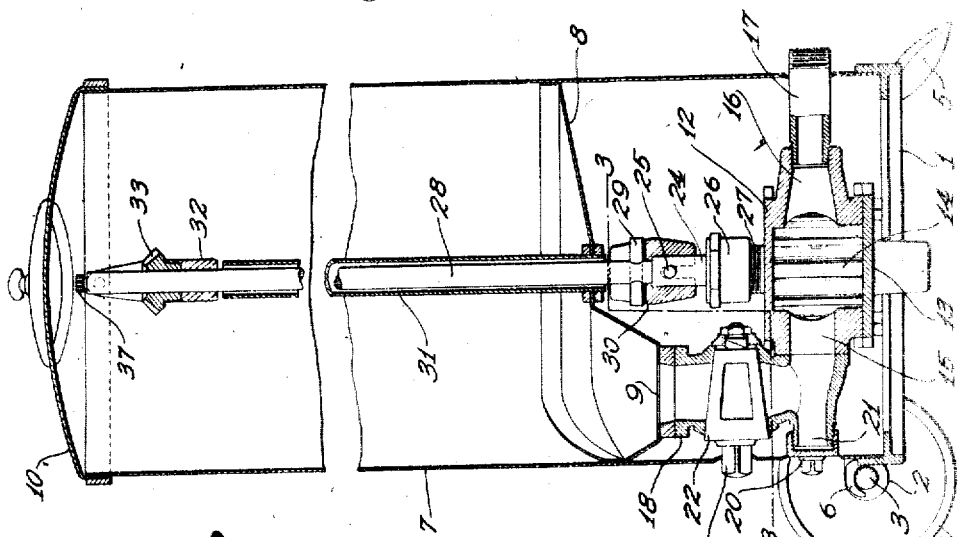

1,479,016

UNITED STATES PATENT OFFICE.

CHARLES H. TEETS, OF UNION, NEW JERSEY.

APPARATUS FOR CLEANING AND FILLING THE TRANSMISSIONS AND DIFFERENTIALS OF MOTOR VEHICLES.

Application filed May 24, 1921, Serial No. 472,161. Renewed November 8, 1923.

*To all whom it may concern:*

Be it known that I, CHARLES H. TEETS, a citizen of the United States, residing in the town of Union and county of Hudson, State of New Jersey, have invented a certain new and useful Apparatus for Cleaning and Filling the Transmissions and Differentials of Motor Vehicles, of which the following is a specification.

This invention is an apparatus for cleaning and filling the transmissions and differentials of motor vehicles and is intended to be used in the cleaning out of old grease from these parts of the vehicle and recharging the same with fresh grease.

The transmission and differential gear cases of motor vehicles as now used are lubricated by heavy grease with which such cases are generally filled, so that the gears of the transmission and differential work in a bath of grease. Through long continued use, this grease becomes filled with grit, dirt, and particles of scale and other impurities, due to wear of the parts, corrosion, etc., and it becomes desirable to remove this grease and fill the cases with the fresh lubricant. Automobiles are so constructed, however, that in many cars, it is practically impossible to move the grease and cleanse the transmission and differential gear housings without dismantling the car and in many instances, in order to renew the grease in the differential, it is necessary to take out the rear end. This operation is expensive and accordingly many car owners and operators continue to use old and dirty grease for long periods, after such grease should have, under ordinary conditions, been removed and replenished with fresh grease. This practice results in undue wear on the gears and other operating parts and shortens the life of the car. However, a large percentage of the cars now in daily use are operated upon grease, which should have been changed several months ago.

With the foregoing considerations in mind, the object of the present invention is to fulfill a long felt need for a device by means of which the transmission or differential housings may be cleansed of residual grease and fresh grease supplied thereto without necessitating the dismantling of the parts.

To this end, the present invention consists in a pump adapted to be operatively connected with the interior of the transmission or differential housing and also with a body of cleansing fluid such for example as kerosene oil. The pump is adapted to be operated to pump in both directions, so that the cleansing fluid may be injected under considerable force into such housings for the purpose of setting up scouring action, whereby the interior of such housings and the gears positioned therein may be scoured, cleaned and free from used lubricant and the operation of the pump thereupon reversed to pump out the mixture of used grease and cleansing fluid. This operation of pumping cleansing fluid into the housings and removing such fluid, is adapted to be repeated several times until the interior of such housings are cleaned, whereupon the pump may be disconnected from the source of cleansing fluid and connected with a reservoir of unused grease. The operation of the pump thereafter will serve to inject unused grease into the housings after supplying the desired quantity of which the pump may be caused to cease operating, disconnect from such housings and the housings sealed by replacing the covers of the hand holes with which such housings are provided.

The apparatus of the present invention has preferably associated therewith a scale, whereby the grease with which the housings are replenished may be measured, so that when the apparatus is used in garages, the amount and consequent cost of the lubricant used may be accurately ascertained.

While the present invention is particularly adapted to use in the manner described for cleaning the differential and transmission housings and subsequent replenishing of the same with fresh grease, the apparatus may be used as a grease supply without necessarily employing it as a cleaning device.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is an elevation of an apparatus embodying the present invention showing the upper portion of the casing of the apparatus in central section.

Figure 2 is a section on the line 2—2 of Figure 3.

Figure 3:
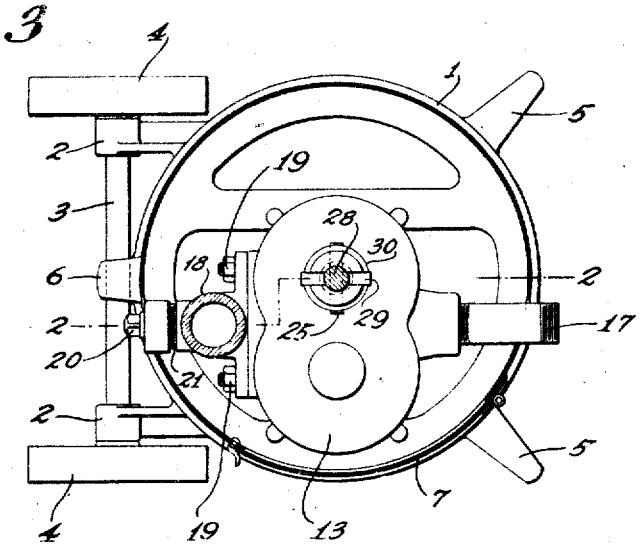
Figure 3 is a plan view of the lower portion of the device with the casing removed, this view showing certain parts in section on the line 3—3 of Figure 2.
Figure 4:
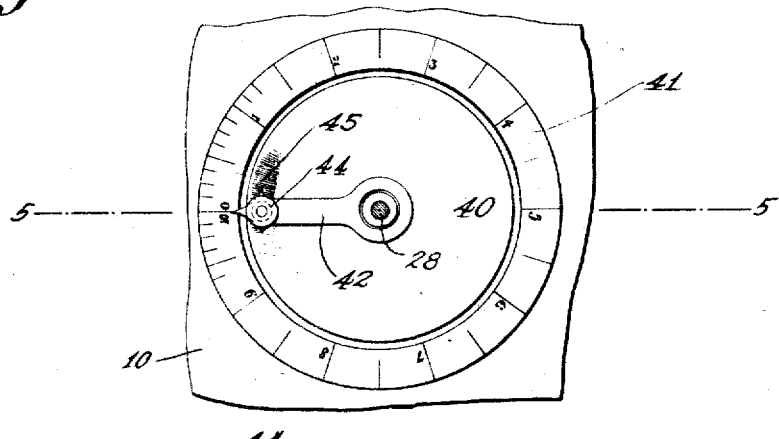
Figure 4 is a plan view of the indicating means shown in Figure 1 as positioned on top of the apparatus; and, Figure 5 is a section on the line 5—5 of Figure 4.
Figure 5:
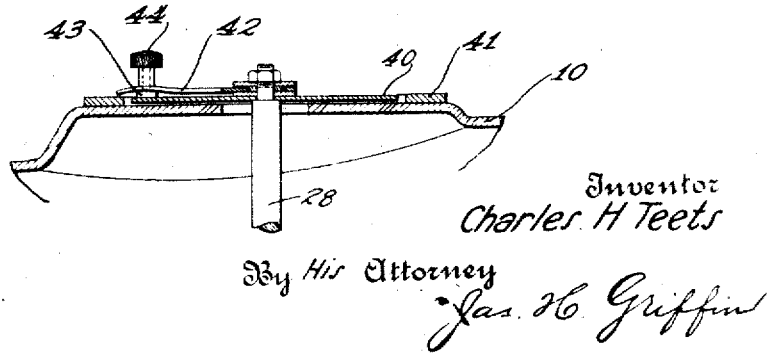

Referring to the drawings, 1 designates a base which may be conveniently made of cast iron and is preferably mounted so as to be readily portable. To this end, the base is provided at one side with laterally projecting bearings 2, which carry an axle 3 having associated therewith wheels 4. The base may, if desired, be mounted on four wheels, though, in practice, two wheels are found sufficient and two legs 5 are cast integral with the base and serve to support the same in horizontal position. In order to take the strain off of the bearings 2 when the device is subjected to hard usage, the base is preferably provided with a lip 6, which reaches out from one side of the base and rests upon the axle 3 as clearly shown in Figures 2 and 3.

Supported on the base 1 is a casing 7, which is divided intermediate its top and bottom into two parts by a partition 8 which is preferably formed so as to slope in the direction of the discharge opening 9. The upper portion of the casing is adapted for the replenishing of grease or other lubricant and is closed by a casing head or cover 10, which may be conveniently secured in place by screws 11. The lower portion of the casing forms a housing for a pump 12 which, in practice, may be in any suitable form, but for the purpose of illustration is shown as a gear pump. Pumps of this character are well known. They embody a casing 13, in which are positioned two gears 14, which mesh with one another in such manner as to form a substantially liquid tight joint along the line of the mesh and the diameters of these gears are such that the outer faces of their teeth operate closely adjacent the walls of the substantially cylindrical chambers in which they are positioned. When the meshing gears 14 are rotated, they collectively function as a pump and may be actuated in either direction in accordance with the direction in which it is desired to pump material. The pump casing 13 is provided with two ducts 15 and 16, which under ordinary conditions, constitute the intake and exhaust respectively. The pump is rigidly mounted on the base and a short length of pipe or tubing 17 associated with the exhaust duct 16, passes through the wall of the casing 17 and into exposed position. A tube or pipe not shown is adapted to be coupled in any suitable manner to the outlet pipe 17 and may be led into the transmission or differential housing for reasons hereinafter explained.

In the preferred form of the invention, a casting 18 is preferably associated with the intake duct 15 of the pump and may be conveniently secured thereto by means of bolts 19, as clearly shown in Figure 3. This casting is, in practice, in the form of a three-way connection having one leg extending in substantial alinement to the intake 15 of the pump, and adapted to be normally closed by a screw cap 20 which may be screwed on or off of the casting through the employment of a suitable wrench. When the cap 20 is removed, a tube or pipe may be coupled to the nipple 21 on which the cap is normally threaded and this tube or pipe may be led to a suitable receptacle or container of kerosene, gasoline or other suitable cleaning fluid.

The upstanding leg of the casting 18 is flanged at its upper end and bolted, screwed or otherwise secured in registration with the outlet 9 of the lubricant reservoir forming the upper part of the casing 7. Said upstanding leg of the casting is normally sealed by a plug cock 22 provided with a polygonal stem 23 adapted for the reception of a suitable wrench by means of which the cock may be manipulated to open or close communication between the lubricant containing reservoir and the pump 12.

The spindle 24 of one of the pump gears 14 is extended above the top of the pump casing and is provided with two laterally extending alined arms 25. The spindle extends upwardly through a boss 27 cast on the casing 12 and a suitable gland or packing box 26 encircles the spindle and threads on to the exteriorly threaded boss 27 for the purpose of forming a tight seal, whereby the entrance of air into the pump is precluded.

Positioned above the spindle 24 and in alinement therewith is an upstanding shaft 28, through the lower portion of which is passed a pin 29. The arms 25 and the pin 29 collectively cooperate with the coupling 30, which latter coupling is bifurcated at its bottom and also bifurcated from its top and is adapted to seat on the upper end of the spindle 24 and to receive the lower end of the shaft 28 in such manner as to lock the shaft to the spindle for simultaneous rotation.

The shaft 28 extends upwardly through the lubricant containing reservoir, is housed within a sleeve 31 and is supported for rotation at its upper end in a bracket 32 as clearly appears from Figure 1. Above the bracket 32 and resting thereon is a bevel gear 33 which is affixed to the shaft 28 and is adapted to mesh with a second bevel gear 34. This second bevel gear is mounted on a shaft 35 which finds bearings in the bracket 32 on the outer end of which is secured a crank 36. When the crank 36 is operated, rotation of the shaft 35 will be transmitted through the bevel gears 34 and 33 to the shaft 28 and thence to the spindle 24 for the purpose of operating the pump and the pump will function to force the liquid in either direction depending upon the direction of rotation of the pulley.

If it is desired to feed the lubricant from the reservoir through the outlet connection 17, it is only necessary to rotate the plug cock 23 into a position to open communication between the reservoir and the pump and thereafter rotate the crank 36 in an appropriate direction to cause the pump to pump the lubricant from the reservoir and discharge it through the outlet 17. It is desirable, however, particularly when the apparatus is used in garages and other places where grease and other forms of lubricant are sold, to definitely ascertain the amount of lubricant thus dispensed in order that an appropriate charge may be made to the customer. To this end, means is associated with the appartus whereby the actual amount of lubricant thus dispensed may be accurately ascertained. To accomplish this result, the upper end of the shaft 28 has affixed thereto a small pinion 37 in mesh with a gear 38. This gear is mounted on a shaft 39, which extends upwardly through the top of the casing head or cover 10 and has firmly affixed thereto a disc 40 rotatable with the shaft 39 and in substantially the same plane has a dial 41 stationary with respect to the cover or casing head. A dial 41 bears proper designations which may either refer to the weight or volume quantities of the material dispensed and with this dial is adapted to cooperate a pointer 42. The pointer 42 is mounted on the upper end of the shaft 39 in a manner to enable the pointer to be rotated irrespective of the shaft. The pointer 42 is preferably in the form of a leaf spring near the outer end of which a small bow shaped leaf spring 43 is secured by means of a thumb screw 44. This bow leaf spring 43 is secured to the pointer intermediate its ends and its free ends are adapted to rest upon the upper face of the disc 40, which, in practice, is radially grooved, corrugated or toothed at 45. This construction enables an operator to grasp the thumb screw 44, lift the pointer 42 so that the hands of the rigid leaf spring 43 will be disengaged from the teeth 45, whereupon the pointer may be moved at will in either direction. The advantage of this construction is that before each dispensing operation, the pointer may be returned to "zero" on the dial, so that at the conclusion of the subsequent dispensing operation, an accurate reading may be had of the amount of lubricant dispensed. When the pointer is released by the operator, the operation of the crank will be accurately recorded upon the dial since the disc 40 rotates in synchronism with the pump and the rigid leaf spring 43 locks the pointer to this disc. This is the preferred form of registering amounts employed with the present invention, though it is not restricted since any suitable form of recording means may be used without departing from this invention.

The manner of employing the apparatus described will now be specifically set forth. In order to fill the reservoir in the upper portion of the casing, the screw cap 20 is screwed on to the nipple 21, the cock 22 is rotated, so as to open communication between the pump and the reservoir, the connection 17 is coupled to a barrel or other container of the lubricant and the crank 36 is operated to pump the lubricant from the barrel into the reservoir. When the reservoir has been filled, the operation of the crank is discontinued and the valve 22 turned off. If it is desired to replenish a transmission or differential housing with lubricant, it is only necessary to couple up the outlet 17 to the housing through the employment of a suitable tube, turn on the valve 22 and operate the crank 36 to pump the lubricant into the housing. However, if it is desired to remove the used lubricant from the housing before putting in fresh lubricant, the following procedure is carried out. The valve 22 is closed, and the cap 20 is removed. A suitable pipe or tube is coupled to the nipple 21 and a suitable tube or pipe is coupled to the outlet 17 and its opposite end thrust into the housing. The crank 36 is now rotated in a retrograde direction and the pump operated to pump the used lubricant from the housing and discharge it through the nipple 21. After the housing is clear of the greater portion of the lubricant, the tube connected with the nipple 21 is thrust into a barrel or container of kerosene, gasoline or other suitable cleaning fluid, whereupon the rotation of the crank 36 is reversed to pump the clean fluid into the housing. This pumping of the fluid is accomplished with considerable force, so that as said fluid enters the housing it does so with a scouring action which washes the interior of the housing clean. After this cleaning operation has been carried on long enough to substantially flood the housing, the rotation of the crank 36 is reversed to pump out the cleaning fluid.

These operations of pumping in cleaning fluid and subsequently pumping it out again may be repeated as many times as necessary to clean the housing of residual grease, oil and impurities, and leave the housing in a clean condition.

The tube associated with the nipple 21 is now removed, screw cap 20 is screwed on to the nipple 21 and the plug cock 22 turned to open position, whereupon the crank 36 may be rotated in a forward direction to pump the desired amount of fresh lubricant into the housing. When the desired amount of such lubricant has been pumped in, the operation of the crank is discontinued, the cock 22 is turned off, and the tube removed from the housing, whereupon the usual hand hole or cover of such housing is returned to its normal position for the purpose of sealing the housing and conditioning the car for use.

This operation of cleaning and replenishing a differential or transmission housing occupies only a few moments in marked contrast to the prior mode of procedure, wherein dismantling of the car has been necessary.

The foregoing described procedure of cleaning the housing and thereafter replenishing the same with fresh lubricant constitutes a novel method on which I propose to file an application for patent.

In the foregoing specification and in the accompanying drawings, I have set forth the preferred embodiment of the present invention, but it is to be understood that the present invention is not limited to the specific details enumerated and that the present invention may partake of various forms commensurate with the appended claims.

Having thus fully described the invention, what I claim as new and desire to secure by Letters Patent is:

1. An apparatus of the character described embodying a reservoir, a pump, a valved duct leading from the reservoir to the inlet side of the pump, a second duct leading away from the inlet side of the pump, means for sealing said second duct, a discharge duct leading from the outlet side of the pump, and means for operating the pump in either direction to pump lubricant from the reservoir through the discharge duct or to pump fluid through the discharge duct to the pump and through said second duct leading from the inlet side of the pump.

2. An apparatus of the character described embodying a pump, a reservoir adapted to contain lubricant, a duct leading from the reservoir to the pump for supplying lubricant to the pump, a second duct for supplying a cleaning fluid to the pump, an outlet duct leading from the pump, means for operating the pump in either direction, whereby either a lubricant or a cleaning fluid may be passed through the pump in either direction, and means whereby either the lubricant or cleaning fluid ducts may be sealed while material is being pumped through the other.

3. An apparatus of the character described embodying a pump, a reservoir adapted to contain lubricant, a valved duct leading from the reservoir to the pump, a second valved duct adapted to lead from a source of cleaning fluid to the pump, an outlet from the pump and means for operating the pump in either direction to permit of the pumping of oil or cleaning fluid in either direction.

4. An apparatus of the character described embodying a pump, a reservoir adapted to contain lubricant, a duct leading from the reservoir to the pump, a second duct leading to the pump and adapted to be connected with a supply of cleaning fluid and a duct leading away from the pump and adapted to communicate with the interior of a housing, and means for operating the pump in either direction to pump cleaning fluid into the housing, to pump lubricant out of the housing or to pump lubricant from the reservoir into the housing, and valvular means for controlling the flow of lubricant from the reservoir or the flow of cleaning liquid or lubricant through said second duct.

5. An apparatus of the character described embodying a pump, a reservoir adapted to contain lubricant, a duct leading from the reservoir to the pump, a second duct leading to the pump and adapted to be connected with a supply of cleaning fluid and a duct leading away from the pump and adapted to communicate with the interior of a housing, and means for operating the pump in either direction to pump cleaning fluid into the housing, to pump lubricant out of the housing or to pump lubricant from the reservoir into the housing, and valvular means for controlling the flow of lubricant from the reservoir or the flow of cleaning fluid or lubricant through said second duct, in combination with means for measuring the amount of material passing through the pump.

6. An apparatus of the character described embodying a gear pump, a reservoir adapted to contain lubricant, means for conveying lubricant from the reservoir to the pump, means for conveying a cleaning fluid to the pump, means for conveying material from the pump, and means for operating the pump in either direction to effect the flow of lubricant or cleaning fluid in either direction through the pump.

7. An apparatus of the character described embodying a gear pump, a reservoir adapted to contain lubricant, means for conveying lubricant from the reservoir to the pump, means for conveying a cleaning fluid to the pump, means for conveying material from the pump, means for operating the pump in either direction to effect the flow of lubricant or cleaning fluid in either direction through the pump, and means for measuring the quantity of material passing through the pump.

8. An apparatus of the character described embodying a casing, the upper portion of which constitutes a reservoir for lubricant, a pump positioned within the lower portion of the casing, a valved connection between the reservoir and the pump, means for also connecting the pump with an exterior source of fluid, and a connection leading from the pump through which said lubricant or fluid after passing through the pump may be discharged, and means for operating the pump.

9. An apparatus of the character described embodying a casing, the upper portion of which constitutes a reservoir for lubricant, a pump positioned within the lower portion of the casing, a valved connection between the reservoir and the pump, means for also connecting the pump with an exterior source of fluid, and a connection leading from the pump through which said lubricant or fluid after passing through the pump may be discharged, and means for operating the pump, in combination with means for measuring the amount of material passing through the pump.

In testimony whereof I have signed the foregoing specification.

CHARLES H. TEETS.